United States Patent [19]
Bickel et al.

[11] 3,914,987
[45] Oct. 28, 1975

[54] ULTRASONIC MEASURING APPARATUS FOR DETERMINING WALL THICKNESS OF A WORKPIECE

[75] Inventors: Wolf Bickel, Cologne; Dietmar Cichos, Dormagen; Ulrich Eichert, Cologne; Franz-Peter Weber, Sindorf; Rolf Werneyer, Cologne, all of Germany

[73] Assignee: Krautkramer-Branson, Incorporated, Stamford, Conn.

[22] Filed: Oct. 3, 1973

[21] Appl. No.: 402,897

[52] U.S. Cl. .................................. 73/67.2; 73/67.7
[51] Int. Cl. ........................................... G01n 29/00
[58] Field of Search ......... 181/.5 R, .5 AP; 310/8.2, 310/8.9; 340/10; 73/67.2, 67.7

[56] References Cited
UNITED STATES PATENTS

| | | |
|---|---|---|
| 3,595,069 | 7/1971 | Fowler .................................. 73/67.2 |
| 3,623,358 | 11/1971 | Suzimoto ............................. 73/67.2 |
| 3,726,129 | 4/1973 | Thorne ................................. 73/67.2 |
| 3,741,334 | 6/1973 | Kaule................................. 181/.5 NP |

Primary Examiner—Maynard R. Wilbur
Assistant Examiner—G. E. Montone
Attorney, Agent, or Firm—Ervin B. Steinberg

[57] ABSTRACT

An ultrasonic measuring apparatus for determining wall thickness of a workpiece comprises an arrangement wherein the workpiece is cyclically urged into resonance responsive to pulse energy from a transmit transducer probe. A receive transducer probe receives the vibrations of the workpiece and a portion of the vibratory energy, comprising the decaying free resonance vibrations, is fed back after amplification to the transmit transducer probe for re-energizing the workpiece. Control means which include an electronic fixed frequency counter are used to provide a time delay for selecting from the received vibrations the free resonance vibrations used for re-energization.

9 Claims, 3 Drawing Figures

ULTRASONIC MEASURING APPARATUS FOR DETERMINING WALL THICKNESS OF A WORKPIECE

BRIEF SUMMARY OF THE INVENTION

This invention relates to an ultrasonic method and apparatus for measuring the thickness of a workpiece by determining the frequency of the resonant vibrations generated by the workpiece under test and wherein these vibrations, suitably amplified, are fed back to the workpiece to cause renewed resonant vibrations.

The prior art, specifically U.S. Pat. No. 3,741,334 issued to Walter Kaule, dated June 26, 1973, entitled "Method and Apparatus for Measuring Thickness by Exciting and Measuring Free Resonance Frequency" discloses the broad principle of the present measuring method. The arrangement described hereafter is characterized by certain advantages and improvements which will be evident from the following description.

The patent supra discloses a device for measuring wall thicknesses by ultrasonic energy whereby the decaying free resonance vibrations from the workpiece under test are delayed by a water column and received by an ultrasonic energy receiver. After a predetermined time delay (depending upon the length of the water column) which is longer than the decay time, the free resonance vibrations from the workpiece are fed back via amplifying means to the ultrasonic energy transmitter for propagation toward the workpiece. The cyclically operated ultrasonic transmitter and receiver are in acoustic energy transfer relation with the workpiece by means of the described water column.

control means coupled to the feedback circuit include timing means to provide that only the electrical oscillations responsive to the free resonance of the workpiece are fed back to the ultrasonic transmitter probe. The timing means inhibit the initial oscillations from the ultrasonic receiver, which oscillations precede the free resonance vibrations of the workpiece, from being fed back to the transmitter probe.

The prior art, specifically Kaule supra, discloses for control and timing purposes an auxiliary transducer which cyclically transmits and receives an ultrasonic signal traversing a delay path. The frequency of operation of this transducer is selected to deviate considerably from the resonance vibrations expected from the workpiece in order to preclude that the actual thickness measurement process will be disturbed. This auxiliary transducer serves, moreover, to mechanically adjust the transducer probe system with respect to the workpiece. The use of the auxiliary transducer has the inherent disadvantage that it is difficult to arrange a transmitter probe, a receiver probe and the auxiliary transducer probe with respect to each other and the workpiece in such a manner that the area on the workpiece where the adjustment procedure is preformed by means of the auxiliary transducer is identical to the surface area at which the thickness measurement is to be performed. The difficulty resides in the fact that three adjustment procedures are required, each dependent upon the other. Even with optimum adjustment of the auxiliary transducer probe it is not distinguishable whether, in the case of a tubing, measurement is effected along a surface line parallel or perpendicular to the workpiece axis. If measurements are made perpendicular to the tubing axis, depending upon the ratio of wall thickness to diameter, other self-resonant vibrations may be induced in the workpiece instead of resonance vibrations useful for thickness measurements. Such other resonant vibrations, e.g. zig-zag shaped shear waves in the entire tubing circumference, lead to erroneous measurements. By aligning the measuring system along a surface line parallel to the axis such undesired resonances are suppressed.

An additional disadvantage of the heretofore known apparatus resides in the fact that an auxiliary transducer must be used driven by an oscillator whose frequency is substantially different from the measuring frequency. The necessity of different frequencies, of course, causes additional cost and complexity.

The instant invention eliminates the need for an auxiliary ultrasonic transducer and its associated circuit and uses instead in the control circuit a fixed frequency driven forward-backwards counting means which controls the operation of the feedback circuit. The counting means provides a time delay by counting "down" in response to the receipt by the receive transducer probe of the workpiece vibration responsive signal and stops such count when a predetermined condition of the counting mean is attained. The attainment of this condition, in turn, permits the ensuing oscillations, representing free resonance vibrations, to be applied via an amplifier to the transmit transducer probe and to be used, moreover, for thickness determination. During the interval in which the transmit transducer probe retransmits the feedback signal portion the counting means counts "up" to accumulate counts for the next cycle of operation. In this manner, the counting means acts as a time delay circuit for delaying closing of the feedback loop until the free resonance vibrations are manifest. Moreover, the counting means automatically adapts itself to the required delay.

A principal object of this invention, therefore, is the provision of a new and improved arrangement for accurately measuring the wall thickness of workpieces using ultrasonic energy.

Another important object of this invention is to provide an apparatus which overcomes certain limitations and disadvantages of the method and apparatus disclosed heretofore.

Another object of the present invention is to provide an arrangement which avoids the use of an auxiliary transducer and requires only an ultrasonic transmit transducer and an ultrasonic receive transducer.

Still another object of this invention is the provision of an improved electronic feedback circuit using a fixed frequency controlled counting means for time delay purposes.

Further and still other objects of this invention will be more clearly apparent by references to the following description when taken in conjunction with the accompanying drawings.

DESCRIPTION OF THE INVENTION

Figure 1:
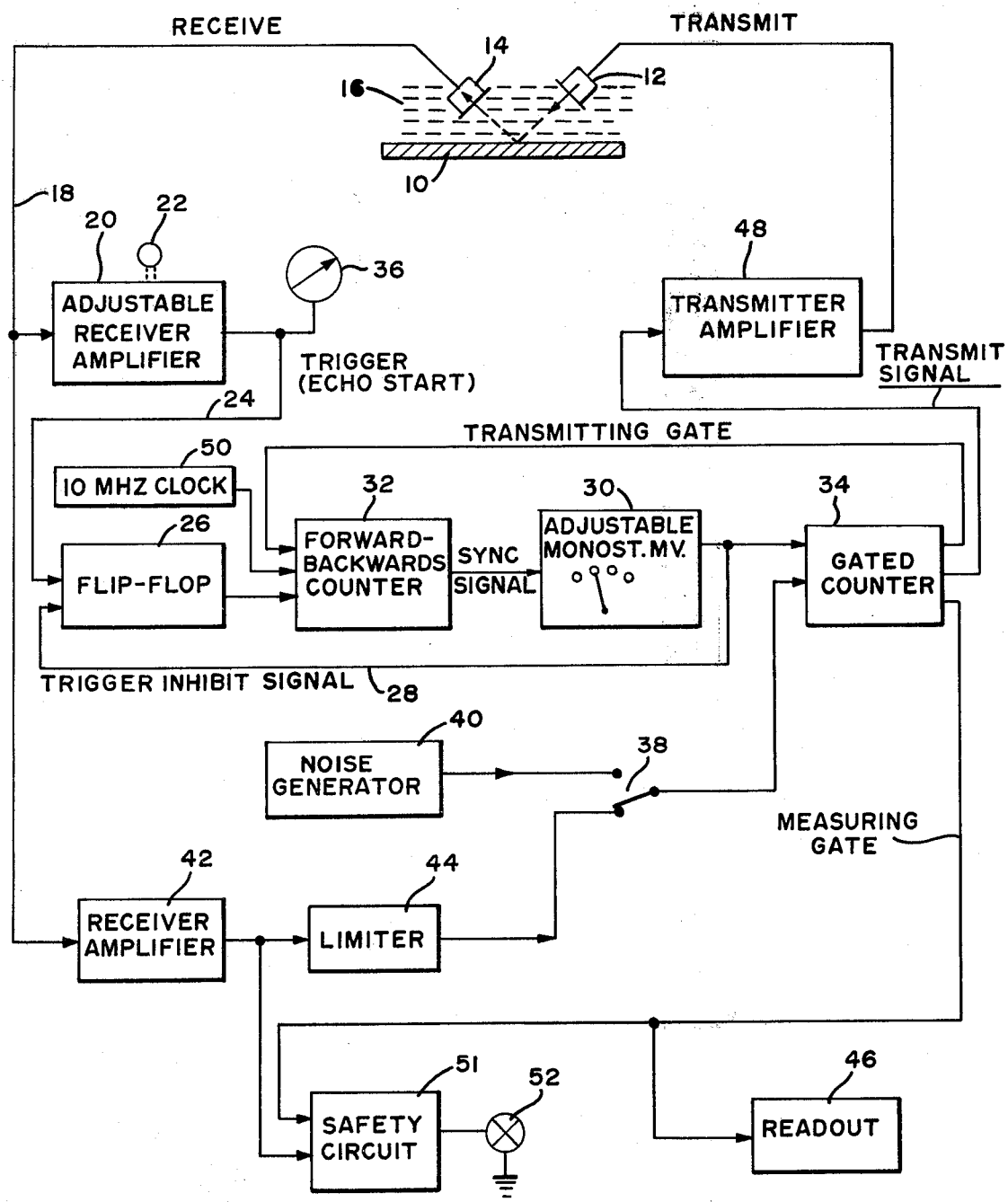
FIG. 1 is a schematic electrical circuit block diagram of the invention.
Figure 2:
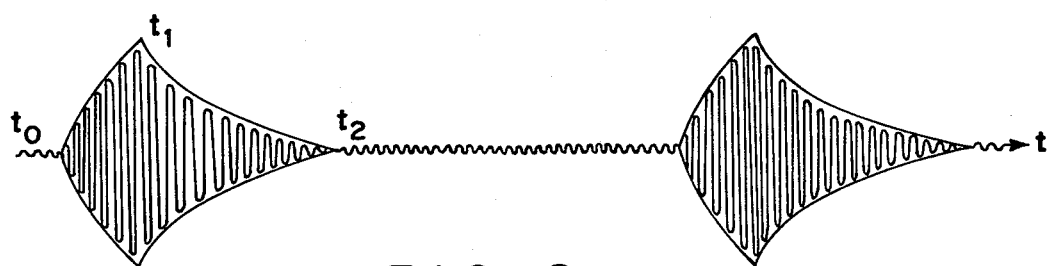
FIG. 2 is an illustration of the acoustic signal received by the receiver probe from the workpiece.

Referring now to the figures and FIG. 1 in particular, a workpiece 10, an ultrasonic transmitter transducer probe 12 and an ultrasonic receiver transducer probe 14 are acoustically coupled to each other by means of a column of liquid 16, such as water. The receiver probe 14 cyclically receives an acoustic signal from the workpiece substantially as shown in FIG. 2. The workpiece 10 is excited cyclically by the acoustic energy from the transmitter probe 12 during the time interval $t_0$ to $t_1$. The workpiece 10 will continue to vibrate at its natural frequency, its free resonance, until the vibratory energy is dissipated at the time $t_2$. During the time interval from $t_1$ to $t_2$ the workpiece 10 will vibrate at its exact resonant frequency and the thickness of the workpiece can be measured by determining the frequency of the resonant vibrations.

Figure 3:
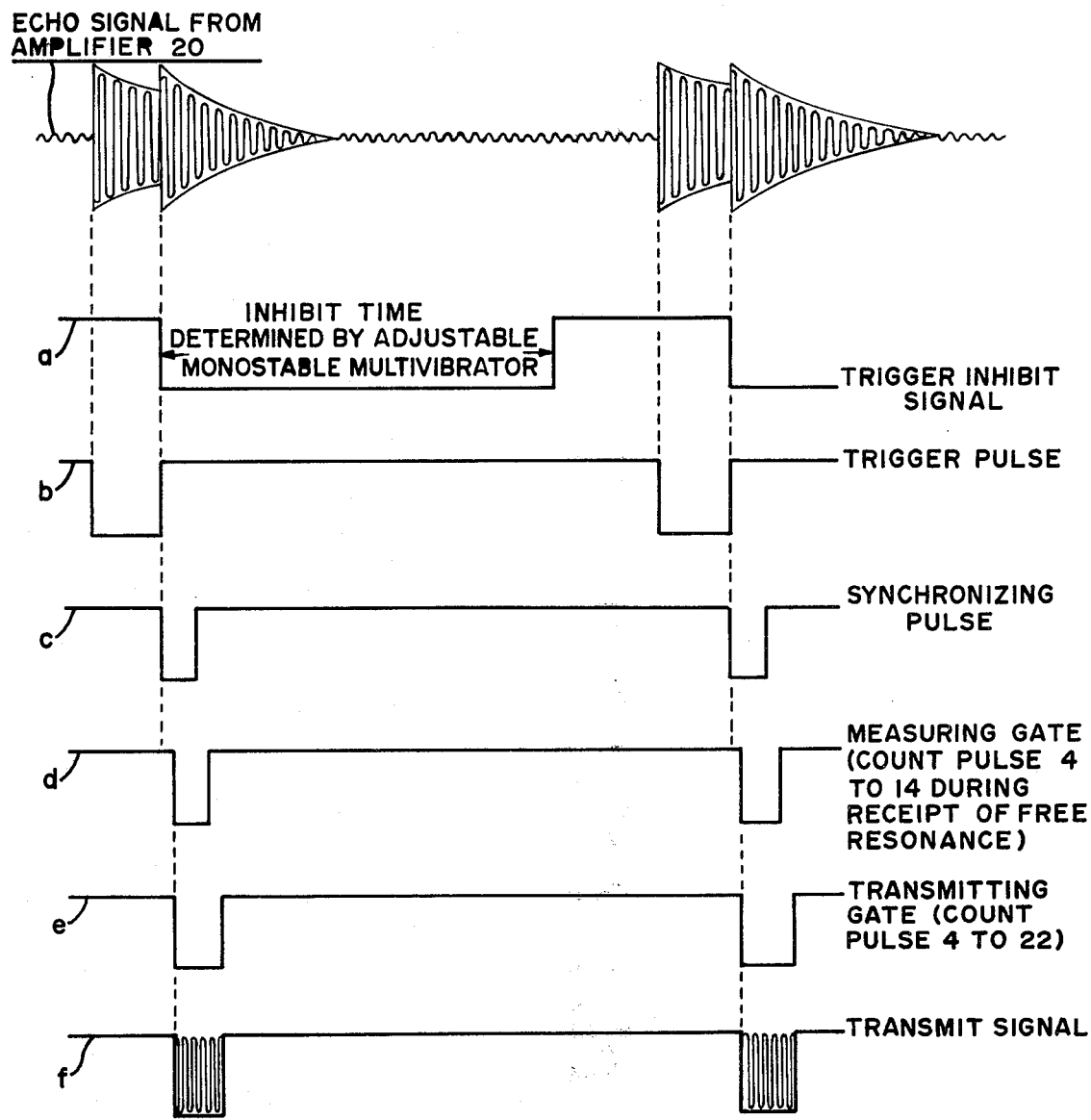
FIG. 3 is a timing diagram of the electrical signals applicable to the circuit per FIG. 1.

The signal received by the receiver transducer probe 14 is provided by conductor 18 to an adjustable receiver amplifier 20, see FIG. 1. The adjustable receiver amplifier 20, used as a comparator, serves as a trigger circuit. The threshold of the receiver amplifier 20 is manually adjustable by means of a control 22. If the received signal amplitude exceeds the adjusted threshold level, a trigger signal is provided along conductor 24 to a flip-flop circuit 26. The trigger signal denotes the start of the echo signal, FIG. 2. If a trigger inhibit signal (FIG. 3, signal a) provided along conductor 28 from an adjustable monostable multivibrator 20 is in the "high" state, a trigger pulse (FIG. 3, signal b) is provided, also known as a bidirectional counter or an up-down counter as described, for instance, in the book "Handbook of Logic Circuits" by John D. Lenk, Reston Publishing Company, Inc., Reston, Virginia, 1972, LC No. 70-185947. The adjustable monostable multivibrator 30 is adjusted such that a trigger inhibit signal blocks the flip-flop circuit and releases the latter (goes into the high state) just prior to the anticipated receipt of the echo signal by the receiver transducer probe 14. The trigger pulse from the flip-flop circuit 26 starts the forward-backwards counter 32, causing it to count down from a previously accumulated count at a predetermined frequency until the forward-backwards counter reaches the zero position. Upon reaching the zero position the forward-backwards counter 32 is stopped and a synchronizing pulse (FIG. 3, signal c), denoting the end of the transmitted signal envelope and the start of free resonant oscillations, is provided from the forward-backwards counter 32 to the adjustable monostable multivibrator 30. The adjustable monostable multivibrator consists of an asymmetric astable multivibrator (clock) synchronized to the synchronizing pulse. The clock triggers an adjustable monostable multivibrator. The synchronizing pulse causes the trigger inhibit signal (FIG. 3, signal a) to revert to the "low" state. The low state of the trigger inhibit signal causes the gated counter 34 to begin counting. The adjustable monostable multivibrator 30 has a switch for adjusting the interval of the monostable time and therefore the duration of the inhibit signal in four steps in proportion to the length of the water path between the transducer probes and workpiece. The duration of the trigger inhibit signal (FIG. 3, signal a) therefore determines the repetition frequency of the oscillations transmitted by the transmit transducer probe 12.

The receiver amplifier 42 coupled to the receiver probe 14 provides a signal to a limiter circuit 44 which provides count pulses via a switch 38 to a gated counter 34. These pulses are commensurate with the frequency of the oscillations of the workpiece, and during the time interval $t_1$ and $t_2$ are commensurate with the free resonance and therefore the thickness of the workpiece. Hence, during the interval $t_1$ to $t_2$ the thickness of the workpiece can be determined with utmost precision. The thickness measuring process is initiated upon the generation of the synchronizing pulse (FIG. 3, signal c) from the forward-backwards counter 32. The gated counter 34 is adjusted so that four "idling" count pulses are counted by the gated counter 34, then the gated counter 34 provides a measuring gate (FIG. 3, signal d), typically from the 4th to the 14th count pulse, to the readout circuit 46, and a transmitting gate (FIG. 3, signal e), typically from the 4th to the 22nd count pulse, to the forward-backwards counter 32, causing the forward-backwards counter 32 to count in the forward direction. The gated counter 34, moreover, provides during the 4th to the 22nd count a transmit signal (FIG. 3, signal f) which comprises the free resonant vibrations now available at the limiter 44 to the transmitter amplifier 48. The gated counter 34 stops forward counting at the end of the transmit gate i.e. count pulse 22. The readout circuit 46 coupled to the gated counter provides a value commensurate with the workpiece thickness based on the length of the time interval between the 4th and 14th count pulse.

During the time interval of the transmit gate, i.e. when the transmitter amplifier 48 is rendered operative, the forward-backwards counter 32 counts up from its zero setting at the predetermined fixed counting frequency of the clock 50, typically at a frequency of 10 MHz. Hence, the forward-backwards counter 32 accumulates a count commensurate with the duration of the transmitting gate. The next trigger pulse (FIG. 3, signal b) starts the forward-backwards counter 32 to count backwards at the same frequency toward zero and the cycle repeats.

The receiver amplifier 42 also provides a signal to the safety circuit 51 which under predetermined conditions will cause indicator light 52 to illuminate in a system failure mode.

The ultrasonic transducers 12 and 14 must be aligned initially for pulse-echo type reflection relative to the workpiece 10. The threshold voltage of the adjustable receiver amplifier 20 is adjusted by control 22 to cause a maximum deflection on the probe position indicator 36. The adjustable threshold insures that the system will trigger on the cyclically received acoustic energy and not trigger on spurious signals. In order to prevent resonance oscillations from causing a wrong indication during such adjustment procedure, the feedback circuit is opened by means of placing switch 38 in the up position until the alignment procedure is completed. When the switch 38 is in the up position, the gated counter 34 is fed with a noise signal (statistically including all frequencies) produced by the random noise generator 40. During the alignment procedure the delay and counting circuitry operates in the same manner as heretofore described with the exception that the transmitted energy is produced by the random noise generator 40 and does not comprise the feedback signal from the workpiece and that the readout circuit will not correctly show the thickness of the workpiece. Maximum deflection of the indicator 36 will indicate optimum mechanical alignment of the probes relative to the workpiece and each other.

For carrying out measurements it will be attempted to operate with the highest possible repetition frequency. The repetition frequency is, however, inversely proportional to the length of the time delay caused by the water path. The possible maximum length of the water path is, therefore, only of secondary importance. Tests have been conducted with a water delay line length up to 150mm. Of the primary importance is the use of the shortest possible water coupling line. The water path must be greater than N/2, where N is proportional to the excitation and resonance delay time, i.e. FIG. 2 the time interval from $t_0$ to $t_2$. For water paths smaller than N/2, the adjustment is dependent upon the wall thickness of the workpiece. A precise indication of the minimum water path is not possible, rather the value must be determined from the workpiece and its thickness. Basically, the water path length should be selected so that the single oscillations still may be resolved. It must be observed, however, that with decreasing frequency the wavelength increases and consequently the delay time (water path) must be selected to be sufficiently large.

What is claimed is:

1. An ultrasonic measuring apparatus for determining the thickness of a workpiece comprising:
   a receive transducer probe for converting acoustic signals responsive to vibrations of a workpiece under test into electrical oscillations and supplying said oscillations as an output;
   a transmit transducer probe having an input for converting electrical oscillations cyclically supplied to said input into vibrations which cause when transmitted to the workpiece under test the workpiece to exhibit free resonance vibrations of decaying amplitude;
   electronic control means which include a forward-backwards counting means counting bidirectionally at a predetermined frequency, said control means connecting the output of said receive transducer probe to the input of said transmit transducer probe in a feedback arrangement to feedback to said transmit transducer probe, responsive to the operation of said counting means, only the free resonance vibrations in the workpiece under test, and
   delay means coupled in circuit with said probes for causing said free resonance vibrations to be fed back after the workpiece has ceased resonating from the vibrations previously transmitted.

2. An ultrasonic measuring apparatus for determining the thickness of a workpiece as set forth in claim 1, said delay means comprising a sound transmission path interposed between at least one of said probes and the workpiece, and means coupled in circuit with said control means and coupled to said counting means for causing said counting means to count in the forward direction and accumulate counts during the time interval in which said transmit transducer probe transmits vibrations to the workpiece and for causing said counting means to start counting backwards, diminishing said accumulated counts, responsive to a signal arising from the receipt of workpiece responsive vibrations by said receive transducer probe.

3. An ultrasonic measuring apparatus for determining the thickness of a workpiece as set forth in claim 2, and including an additional counting means coupled in circuit with said control means for counting the oscillations manifest at the output of said receive transducer probe, and means coupled to said forward-backwards counting means and said additional counting means for causing said additional counting means to be rendered operative responsive to said forward-backwards counting means attaining a predetermined count condition.

4. An ultrasonic measuring apparatus for determining the thickness of a workpiece as set forth in claim 3, and including readout means coupled to said additional counting means for indicating responsive to the frequency of said oscillations a value commensurate with the thickness of the workpiece, and said additional counting means including a gate means for causing said readout means to be rendered operative after the receipt of a predetermined quantity of oscillations by said additional counting means.

5. An ultrasonic measuring apparatus for determining the thickness of a workpiece as set forth in claim 3, and including readout means coupled to said additional counting means for indicating responsive to the frequency of said oscillations a value commensurate with the thickness of the workpiece, and said additional counting means including a gate means for causing said readout means to be rendered operative for a predetermined quantity of oscillations received by said additional counting means.

6. An ultrasonic measuring apparatus for determining the thickness of a workpiece as set forth in claim 1, and including a random noise generator; switching means coupled for selectively interrupting said feedback arrangement and coupling said noise generator to said transmit transducer probe for aligning the position of said transmit and receive transducer probes relative to the workpiece, and signal amplitude responsive indicating means coupled to said receive probe for providing an indication of such alignment as a function of the amplitude of the signal received by said receive transducer probe.

7. An ultrasonic measuring apparatus for determining the thickness of a workpiece as set forth in claim 3, and adjustable time delay means coupled between said forward-backwards counting means and said additional counting means for varying the repetition rate of the cyclically transmitted vibrations in relation to the length of said sound transmission path.

8. An ultrasonic measuring apparatus for determining the thickness of a workpiece comprising:
   a receive transducer probe for converting acoustic signals responsive to vibrations of a workpiece under test into electrical oscillations and supplying said oscillations as an output;
   a transmit transducer probe having an input for converting electrical oscillations cyclically supplied to said input into vibrations which cause when transmitted to the workpiece under test the workpiece to exhibit free resonance vibrations of decaying amplitude;
   electronic control means which include a counting means counting bidirectionally at a predetermined frequency, said contrrol means connecting the output of said receive transducer probe to the input of said transmit transducer probe in a feedback arrangement to feedback to said transmit transducer probe, responsive to the operation of said counting means, only the free resonance vibrations in the workpiece under test, and delay means coupled in circuit with said probes for causing said free resonance vibrations to be fed back after the workpiece has ceased resonating from the vibrations previously transmitted.

9. An ultrasonic measuring apparatus for determining the thickness of a workpiece by means of utilizing for measurement the decaying free resonant vibrations produced by the workpiece which apparatus includes a feedback circuit for causing the vibrations produced by the workpiece to be sensed by an ultrasonic receive transducer probe and fed back to an ultrasonic transmit transducer probe for causing said transmit transducer probe to transmit the vibrations only after the decaying free resonant vibrations of the workpiece resulting from a preceding operation of the transmit transducer probe have ceased, and including control means for controlling the feedback circuit for causing said transmit transducer probe to be rendered operative for transmitting vibrations upon the receipt of the decaying free resonant portion of the vibrations, the improvement comprising:

a forward-backwards counting means counting at a predetermined frequency;

means for causing said counting means to accumulate counts during the interval in which said transmit transducer probe transmits vibrations and for causing said counting means to decrease the accumulated counts responsive to a signal which is responsive to the workpiece responsive vibrations received by said receive transducer probe;

a further counter coupled to said forward-backwards counting means;

means actuating said further counter when said forward-backwards counting means attains a predetermined status, and means for causing said further counter responsive to its actuation and subsequent to the passage of a predetermined first quantity of counts of vibrations from said receive transducer probe to count a predetermined second quantity of such counts of vibrations, the time span for counting said second quantity of counts being a measure of the thickness of the workpiece.

* * * * *

UNITED STATES PATENT OFFICE
CERTIFICATE OF CORRECTION

PATENT NO. : 3,914,987
DATED : October 28, 1975
INVENTOR(S) : WOLF BICKEL ET AL

It is certified that error appears in the above-identified patent and that said Letters Patent are hereby corrected as shown below:

Column 1, line 58 delete "preformed" and insert therefor --performed--.

Column 3, line 27 delete "20" and insert therefor --30--.

Column 3, line 28, after the word "provided" and before the comma insert --from the flip-flop circuit 26 to a forward-backwards counter 32--.

Column 4, line 2, delete "and" and insert therefor --to--.

Column 5, line 11, delete "delay" and insert therefor --decay--.

Column 6, line 62, delete "contrrol" and insert therefor --control--.

Signed and Sealed this twenty-fourth Day of February 1976

[SEAL]

Attest:

RUTH C. MASON
Attesting Officer

C. MARSHALL DANN
Commissioner of Patents and Trademarks